United States Patent [19]

Parmentier

[11] Patent Number: 4,931,177
[45] Date of Patent: Jun. 5, 1990

[54] COMPOSITE PLATE FOR FILTER-PRESSES

[76] Inventor: Alfred H. Parmentier, 69, Bd Machtens B6, B-1080 Brussels, Belgium

[21] Appl. No.: 285,271

[22] Filed: Dec. 16, 1988

Related U.S. Application Data

[63] Continuation-in-part of Ser. No. 14,043, filed as PCT BE86/00007 on Mar. 5, 1986, published as WO86/07282 on Dec. 18, 1986, abandoned.

[30] Foreign Application Priority Data

Jun. 4, 1985 [FR] France .................. 85 08529
Jul. 24, 1985 [FR] France .................. 85 11424

[51] Int. Cl.$^5$ .......................... B01D 25/12
[52] U.S. Cl. .................. 210/228; 210/230; 210/231; 100/115; 100/199; 100/211; 100/295
[58] Field of Search .................. 210/224–231; 100/198, 199, 211, 113, 115, 295

[56] References Cited

U.S. PATENT DOCUMENTS

| | | | |
|---|---|---|---|
| 2,949,845 | 8/1960 | Kurita | 100/198 |
| 3,153,630 | 10/1964 | Green | 210/230 |
| 3,270,887 | 9/1966 | Juhasz et al. | 210/225 |
| 3,289,845 | 12/1966 | Weber | 210/231 |
| 3,347,383 | 10/1967 | Augerot | 100/198 |
| 3,503,326 | 3/1970 | Juhasz et al. | 100/211 |
| 3,926,811 | 12/1975 | Ramsteck | 210/231 |
| 3,931,014 | 1/1976 | Heimbach et al. | 210/231 |
| 4,166,035 | 8/1979 | Ramsteck et al. | 210/231 |
| 4,226,721 | 10/1980 | Baas | 210/225 |
| 4,229,303 | 10/1980 | Heinrich et al. | 210/225 |
| 4,251,373 | 2/1981 | Nakamura | 210/225 |
| 4,265,749 | 5/1981 | Busse et al. | 210/230 |
| 4,584,100 | 4/1986 | Choquenet et al. | 210/230 X |
| 4,668,392 | 5/1987 | Juhasz | 210/227 |

FOREIGN PATENT DOCUMENTS

| | | |
|---|---|---|
| 0051683 | 5/1982 | European Pat. Off. |
| 0052174 | 5/1982 | European Pat. Off. |
| 0081715 | 6/1983 | European Pat. Off. |
| 0117159 | 8/1984 | European Pat. Off. |
| 1436279 | 12/1968 | Fed. Rep. of Germany |
| 1536844 | 2/1970 | Fed. Rep. of Germany |
| 1611139 | 10/1970 | Fed. Rep. of Germany |
| 3313955 | 2/1984 | Fed. Rep. of Germany |
| 1234366 | 5/1960 | France |
| 1283313 | 12/1961 | France |
| 1464767 | 11/1966 | France |
| 1478297 | 3/1967 | France |
| 2215258 | 8/1974 | France |
| 2255092 | 7/1975 | France |
| 2382257 | 9/1978 | France |
| 2384526 | 10/1978 | France |
| 2441405 | 6/1980 | France |
| 2444488 | 7/1980 | France |
| 451091 | 5/1968 | Switzerland |
| 1118383 | 7/1968 | United Kingdom |

Primary Examiner—W. Gary Jones
Attorney, Agent, or Firm—Roylance, Abrams, Berdo & Goodman

[57] ABSTRACT

Composite, unbreakable plates for filter-presses are formed by the firm assembly of, in succession for each plate, a first thin frame 1 collecting the filtrates, a grooved resilient membrane 4 to squeeze the cake, a second thin frame 3 forming a chamber for the fluid inflating the membranes, a second similar membrane, and a third thin frame similar to the first frame. The filtration composite plate cooperates with a frame or is a recess plate which is spaced for unloading of the cakes collected. Each plate or frame has a small jack operating between small extensions at the top of the frames or on top of the plates for separating the plates.

10 Claims, 4 Drawing Sheets

4,931,177

COMPOSITE PLATE FOR FILTER-PRESSES

REFERENCE TO RELATED APPLICATION

This application is a continuation-in-part of U.S. patent application Ser. No. 014,043, filed as PCT BE86/00007 on Mar. 5, 1986, published as WO86/07282 Dec. 18, 1986, now abandoned, entitled "Filter-Presses", the subject matter of which is hereby incorporated by reference.

FIELD OF THE INVENTION

The present invention relates to unbreakable, light filtration plates for a filter press for separating the solid and liquid phases of a slurry in which the solid is compressed into a filter cake as the liquid is separately conveyed away. The filter cake is subsequently dislodged from the filter press, by separation of the plates by small jacks.

BACKGROUND OF THE INVENTION

A filter press generally comprises a vertical fixed resisting end plate and a head resisting plate, connected by external parallel beams. Between the end and head plates, a mobile resisting plate is moveably supported on the beams and is moved by a powerful double effect jack, fixed on the head resisting plate. A plurality of filtration members are supported on the beams between the end and mobile plates and are slidably mounted on the beams. These filtration members are pressed tight against each other or are spaced apart from each other by the thrust or retraction of the jack acting on the mobile plate. The filtration members can be filtration plates and frames or recessed plates.

According to conventional techniques, the filtration plate has, on its periphery, a certain width which forms a flat sealing surface for sealing the filter press when closed. Between the sealing surfaces, the plate is grooved or pipped on both sides. Both faces of the plate are covered by a filter cloth.

The frame joining the plate is of the same size as the sealing surfaces. When the filter press is sealed closed, slurry is injected under pressure into the frame. The liquid or filtrate traverses the filter cloths, flows into the grooves in the plates, and is evacuated through apertures in the bottoms of the plates. The solid material or cake is retained by the filter cloths.

When the frame is filled by the filter cake, the cake can be desalted by washing and dewatered by an important compressed air blowing operation. Subsequently, the filter press is opened by retraction of the jack and the mobile resisting plate.

To remove the filter cakes, the plates and frames must be separated. The separation can be accomplished by various means, such as chains, hooks, distancers, a mobile pendulum, or other means. After the cakes are removed, the filter presses are reclosed to start another filtration cycle.

The filtration members can also be recessed or chambered plates which can operate without frames. The two faces of these thicker plates are hollow between the sealing surfaces at the periphery to define a chamber inside of the sealing surfaces. The bottom of this hollow portion is grooved or pipped. These recessed plates are also covered by a filter cloth.

When two plates are tightly closed against each other, the cake is formed in the two adjacent chambers forming and operating as a frame. However, it is more difficult to inject slurry into these chambers than in a frame system. These recessed plates perform the same function as the plates and frames discussed above.

To dewater the cakes and to avoid the expensive air blowing operation, membranes have been provided in conventional filter presses to squeeze the cakes. However, the plates used in such conventional systems are full plates formed of completely rigid material, such as steel, cast iron, aluminum, plastics or the like. Such plates with membranes are heavy and are difficult to move along the beams of the filter press. In order to move such plates, very strong jacks or other moving means must be employed.

If the slurry is fed into one of the two frames next to a plate and the feed is blocked to the second frame, a high differential pressure is exerted on the grooved part of the plate. Such high differential pressure breaks or deforms the plate rendering the plate unusable. This also requires the expensive replacement of the plate. The same frequent accident also occurs with chambers of joined recessed plates.

It is also known to feed the slurry through one hole made in the grooved part of the plate. In this case, the filter cloths must be safely tightened around this hole by fixing pieces. This fixing of the filter cloths takes extensive time during filter cloth replacement. If a membrane is installed under the filter cloth, it also must be tightened by the same pieces as shown in U.S. Pat. No. 3,503,326. However, compressed air supplied to the back of the membranes to inflate them for squeezing the cakes will tend to tear the membranes out of the fixing pieces. Consequently, compression of the filter cake can only be achieved at low pressure. Additionally, the membranes cannot be uniformly inflated due to this means of fixing the filter cloth.

As disclosed in U.S. Pat. No. 3,503,326 in FIG. 7 thereof, it is also known that only one membrane can be used with a plate, reducing the compression efficiency. Compression efficiency will be significantly enhanced with the use of two membranes to squeeze one cake.

The membranes such as those in the above-mentioned U.S. patent are smooth. Other conventional membranes are grooved or pipped on one side. It is impossible to filter on the side of a smooth membrane since inadequate space is provided for the flow of the filtrate or liquid. Consequently, a cake is filtered by one filter cloth only, adversely affecting the productivity of the filter press.

It is further known that membranes are not fitted to the plates, but are made part of separate membrane supports or bearers. The membranes are formed by a bag inside the bearer; see for example, U.S. Pat. No. 3,503,326.

SUMMARY OF THE INVENTION

An object of the present invention is to provide a filter press with plates using far less rigid material (e.g., polypropylen), as compared to the conventional full thick plates, by using only three thin frames having widths corresponding only to the necessary requirement for the sealing surfaces of a filter press under filtration pressure.

Another object of the present invention is to provide plates for a filter press having grooved parts formed by two elastic membranes, thereby avoiding the rigid grooved parts of conventional plates.

Yet another object of the present invention is to provide a filter press which has composite, unbreakable, undistortable, light plates, which light plates are easy to move along the beams of the filter press to thereby permit the use of simpler means for spacing the plates to unload the filter cakes.

The foregoing objects are obtained by a composite plate for a filter press comprising an extension extending from and fixed to the composite plate, and a jack engaging the extension for selectively separating adjacent composite plates for removal of a filter cake between adjacent composite plates. The composite plate includes a first thin rigid frame receiving a cake and collecting the filtrates and successively, a first grooved membrane, a second thin rigid frame forming a chamber for a compressed fluid (air, water . . . ), a second grooved membrane identical to the first membrane, a third rigid frame identical to the first rigid frame and filter means on the first and third frames. The first and second membranes and the second frame define a fluid chamber for inflating the membranes to compress one cake between adjacent composite plates (recessed) or in a frame between two plates (plates and frames system).

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this disclosure.

DETAILED DESCRIPTION OF THE PREFERRED EMBODIMENTS

Figure 1:
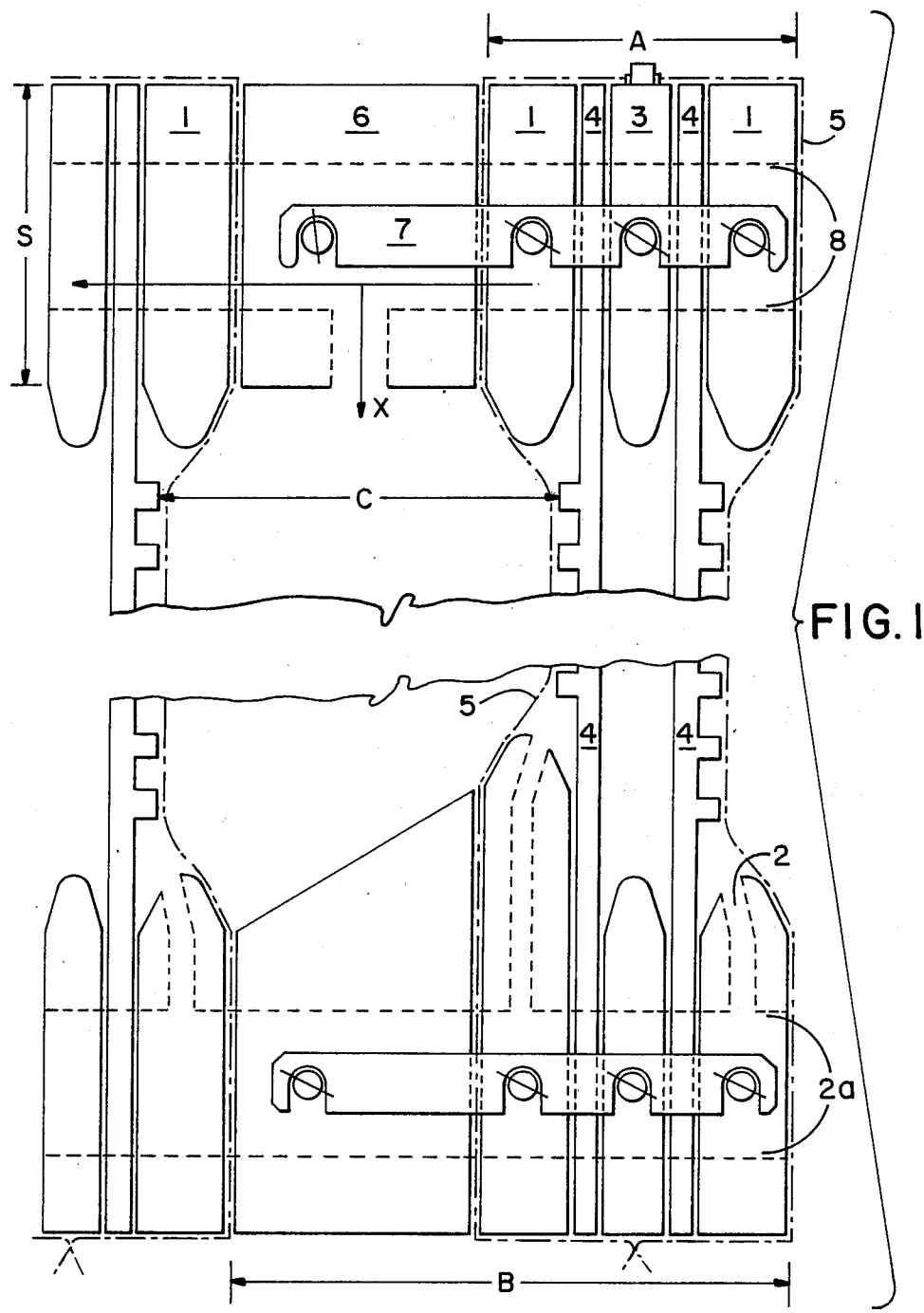
FIG. 1 is a side elevational view in vertical section of a plate of a filter press in accordance with a first embodiment of the present invention (plates and frames system)

FIG. 1 illustrates a composite, unbreakable, light plate for a filter press according to the present invention. Each plate A is a composite since it is not of a unitary complete, rigid, thick, heavy and unbreakable structure, and since it can be easily disassembled into its constituent parts. The composite plate of the present invention is made up of different parts or constituents which are assembled together. The composite plate of the present invention receives a part of the filter cake, collects the filtrates, and compresses the filter cake.

Composite plate A comprises three thin frames limited in width to form the sealing surfaces S only as its sole rigid material. The three frames comprise first and third external frames 1 and 1, and central frame 3. The two external frames 1 have at their lower side portions small conduits 2 to evacuate the filtrates to a general collecting duct 2a. Collecting duct 2a is formed by a succession of holes bored in lower corners of the composite plate.

Central frame 3 has two membranes 4 on its opposite sides. The central frame, along with the membranes, define or limit a space to which compressed fluid can be fed for inflating the two membranes. The membranes are grooved or pipped on their outer surfaces, and are made of an elastomer, for example, rubber or other flexible material.

The three thin frames and the two membranes are assembled by bolts passing through their thickness, which bolts are threadably attached to nuts (not illustrated). Filter cloths 5, providing a filtering agent, surround the composite plate, which may cooperate with a frame 6. The composite plate and frame 6 may be independent or can be assembled by external clamp 7 which permits rapid removal of the filter cloth when replacement of the filter cloth is desired.

The filter cake C is formed within the filtration unit B. This unit receives slurry fed under pressure through general conduit 8 formed by a succession of holes bored in the upper corners of the thin frames of the plates, membranes, cloths and frame 6. The slurry is conveyed in the direction indicated by arrow X. Due to the filtration pressure, the liquid phase of the slurry traverses the two filter cloths, flows into the grooves or between the pips of the two membranes, and is evacuated through conduits 2 and 2a.

When frame 6 (or chambers of a recessed plate) is filled by a filter cake formed by the solid material filtered out of the slurry by filter cloths 5, the filter cake can be presqueezed by expansion of the two membranes. This operation is performed in case the cake must be desalted by washing.

After this washing of the cake, the cake is squeezed at high pressure in the same manner to dewater the cake to the greatest extent possible.

Figure 2:
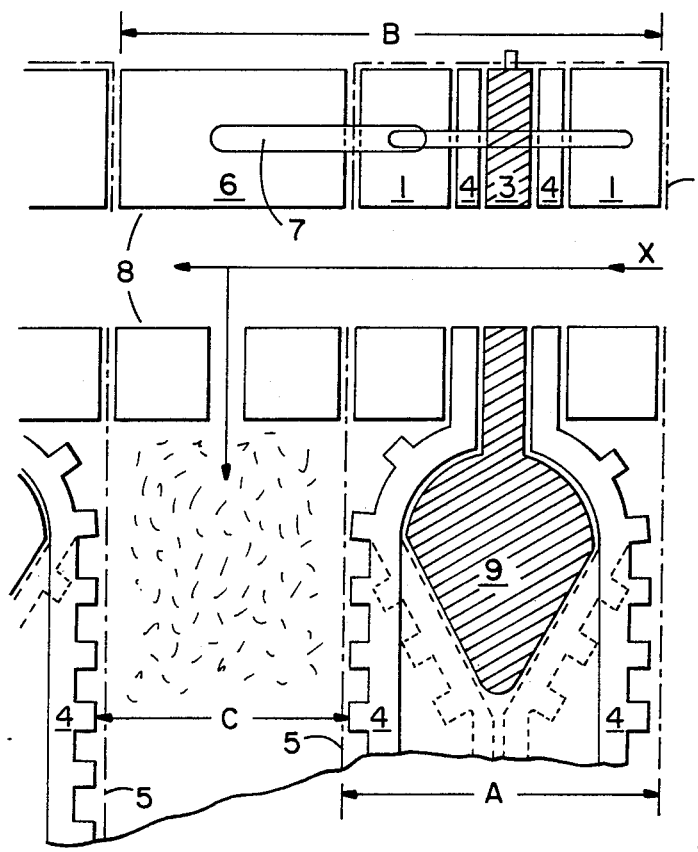
FIG. 2 is a partial, side elevational view of a plate of a filter press according to a second embodiment of the present invention.

The form of the present invention, illustrated in FIG. 2, can produce cakes for small thickness only. To squeeze this small thickness cake and to allow evacuation of a large amount of liquid or filtrates, the membranes are pushed into frames 1 and 2 by providing central frame 3 with an internal extension 9 enlarged in the chamber for the compressed fluid inflating the membranes by bosses on extension 9.

Figure 3:
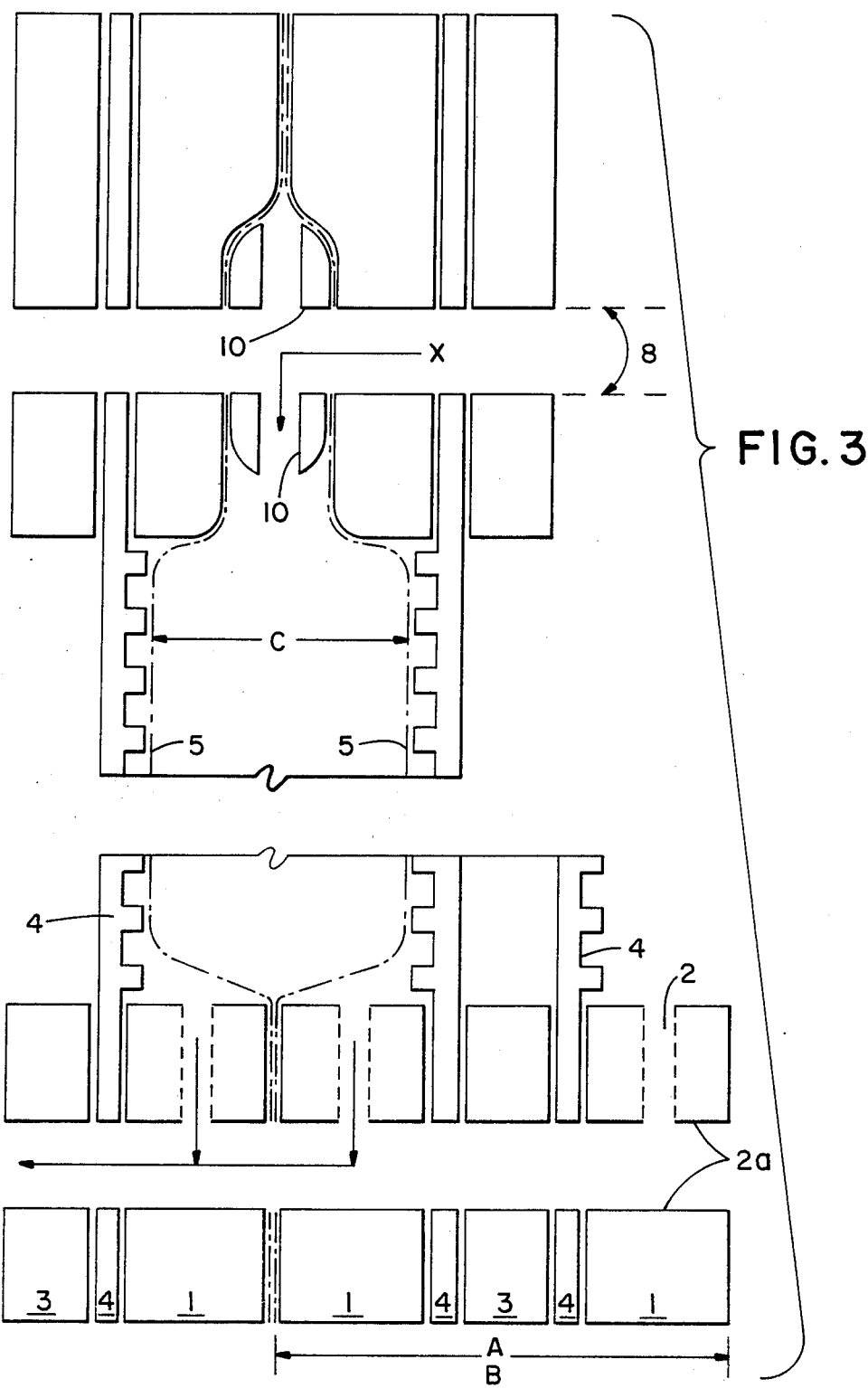
FIG. 3 is a side elevational view in vertical section of a composite recessed plate according to the present invention.
Figure 5:
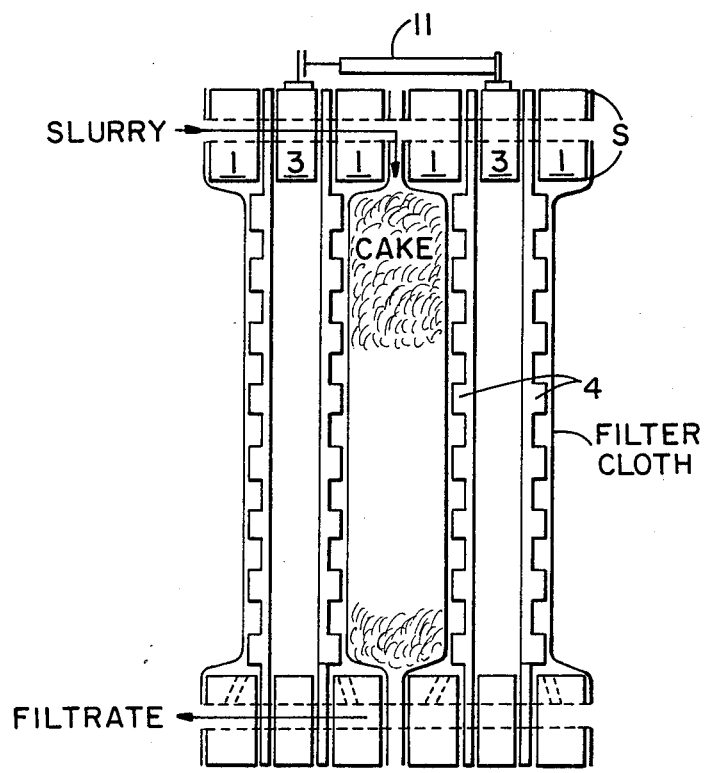
FIG. 5 is a side elevational view of a portion of a filter press according to the present invention.

FIG. 3 illustrates a form of the present invention where the filter press comprises recessed plates. The recessed plates are formed by, in sequence, cloth 5, frame 1, membrane 4, central frame 3, membrane 4, frame 1 and cloth 5. Frame 6 is eliminated. The recessed composite plates of a filter press are tight together for the filtering operation. However, it may be more difficult to feed the slurry into the chamber formed in this manner. Conventional systems for conveying the slurry into this chamber can be employed to effect a rapid feeding of the slurry.

As example, the slurry is fed through general conduit 8. The two external frames 1 are recessed to form a space for a double clamp 10 fixing filter cloths 5, and providing a space for conducting the slurry into the chamber in the direction indicated by arrow X.

Figure 4:
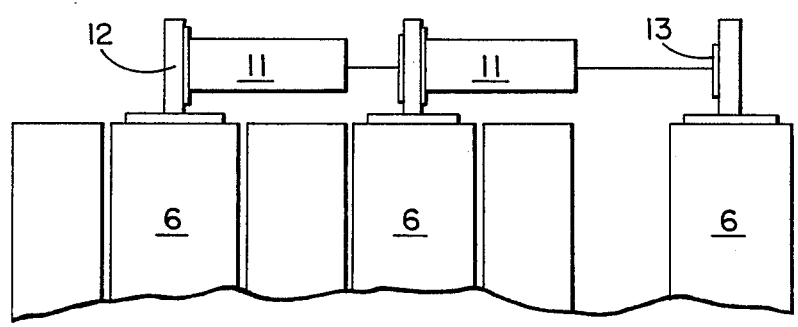
FIG. 4 is a side elevational view of plates and frames of a filter press with means to space the plates and frames and/or recessed plates of the filter press.

FIG. 4 illustrates composite plates and frames (plates/frames systems) according to the present invention, which are four to five times lighter than conventional complete, rigid and heavy plates. The lighter plates of the present invention permit use of a simpler means to space the plate-frame assemblies or the recessed plates, in order to remove the cakes. This avoids use of complicated, heavy means such as chains, hooks, motors, reversing devices and the like.

Each frame 6 is fitted with a small vertical member 12 of steel. This member can be 10 centimeters by 10 centimeters and is sufficient for a frame of 1.5 by 1.5 meters. A small jack 11 is fixed on one member 12. The shaft of this jack bears on a small sheet 13 of steel which freely contacts the back member 12 of the next adjacent frame 6. When compressed air is fed to the jack, the stroke of the shaft or piston pushes the next frame 6 creating a space to permit the cake to fall out or down. The recessed plates may be separated by the same means.

A small jack of four centimeters in diameter fed by eight bars of pressure easily pushes a frame and its cake and the next plate also sized at 1.5 by 1.5 meters. To unload the cakes, the powerful jack of the filter press first retracts the mobile post by a distance to provide a space having at least a thickness of the cake and a free supplementary distance. Then the jacks 11 are successively and automatically operated.

While various embodiments have been chosen to illustrate the invention, it will be understood by those skilled in the art that various changes and modifications can be made therein without departing from the scope of the invention as defined in the appended claims.

I claim:

1. A composite plate for a filter press, comprising, in sequence:
    a first thin rigid frame for collecting filtrates and receiving a filter cake;
    a first grooved, elastic membrane;
    a second thin rigid frame attached to said first membrane;
    a second grooved, elastic membrane, said first and second membranes and said second frame defining a fluid chamber for receiving compressed fluid to inflate said membranes;
    a third thin rigid frame;
    filter means on said first and third frames;
    coupling means for releasably attaching said frames, said membranes and said filter means;
    a rigid extension extending from a top of the composite plate; and
    a jack engaging said extension for selectively separating adjacent composite plates for removal of a filter cake therebetween.

2. A composite plate according to claim 1 wherein said second frame comprises an internal extension with bosses carrying said membranes to enlarge said fluid chamber in the composite plate.

3. A composite plate according to claim 1 wherein removable clamp means couple each said first, second and third frames to a fourth frame for rapid release.

4. A composite plate according to claim 1 wherein each of said rigid frames is annular.

5. A composite plate according to claim 1 wherein each of said rigid frames is peripherial and surrounds a hollow interior.

6. A composite plate according to claim 1 wherein said elastic membranes are flexible.

7. A composite plate according to claim 1 wherein said elastic membranes are elastomeric.

8. A composite plate according to claim 1 wherein said rigid frames and said elastic membranes are formed of different materials.

9. A composite plate according to claim 1 wherein said first and second membranes comprise peripheral portions trapped and retained between said first and second rigid frames and said second and third rigid frames, respectively.

10. A composite plate according to claim 1 wherein said jack is directly mounted on an adjacent composite plate and engages said extension for separating the adjacent composite plates for removal of the filter cake therebetween.

* * * * *